No. 731,139. Patented June 16, 1903.

UNITED STATES PATENT OFFICE.

ARNOLD STEINER, OF BASLE, SWITZERLAND, ASSIGNOR TO THE FIRM OF CHEMICAL WORKS, FORMERLY SANDOZ, OF BASLE, SWITZERLAND.

SULFO-ACID OF AROMATIC ALDEHYDE AND PROCESS OF MAKING SAME.

SPECIFICATION forming part of Letters Patent No. 731,139, dated June 16, 1903.

Application filed October 30, 1902. Serial No. 129,427. (No specimens.)

*To all whom it may concern:*

Be it known that I, ARNOLD STEINER, doctor of philosophy, residing at Basle, Switzerland, have invented new and useful Improvements in the Manufacture of Sulfo-Acids of Aromatic Aldehydes, of which the following is a specification.

Sulfo-acids of aromatic aldehydes have been obtained by "sulfonation" of the benzaldehyde, and lately, according to the process described in the German Patent No. 88,952 and its amendments, by transformation of the chlorinated benzaldehydes with alkali sulfites under pressure. Thus the valuable benzaldehyde-ortho or ortho-para-disulfo acid is produced. According to the process described in the German Patent No. 119,163 benzaldehyde-ortho-sulfo-acid was also obtained by oxidation of ortho-stilbendi-sulfo-acid with a watery solution of permanganate and the paranitro-benzaldehyde-ortho-sulfo-acid, although less advantageously by direct oxidation of paranitrotoluene sulfo-acid with a solution of hypochlorite. This process if applied to the sulfo-acids or aromatic hydrocarbons with a lateral methyl group shows only traces of aldehyde sulfo-acids.

While the hydrocarbons such as toluene, xylene, or their nitro products are easily converted into aldehydes, the toluene or xylene sulfo-acids produce by oxidation in either alkaline or acid watery solution, principally the respective sulfo-benzoic acids. Having observed that by this means are always obtained small quantities of aldehydes besides their sulfobenzoic acids, I have succeeded in establishing the conditions under which aldehydes exclusively are formed.

The process is based on the oxidation without water in the presence of anhydrous sulfuric acid. The oxidation of the methyl group remains stationary in the formation of aldehyde only even if the oxidizing material is in excess, and, on the contrary, this excess is necessary to obtain good yields.

*Example I—Process for the preparation 1.2.4 benzaldehyde disulfo-acid.*—Ten kilos of toluene are transformed in the usual way by means of oleum into disulfo-acid, whereby as the principal product the 1.2.4 compound is obtained. On the other hand, fifty kilos finely-powdered peroxid of manganese, or preferably regenerated peroxid of manganese, are added to five hundred kilos anhydrous sulfuric acid of twenty-five per cent. $SO_3$. At 15° to 20° centigrade and under continuous stirring the aforementioned melt is mixed therewith, whereby the temperature rises to 30° to 35° centigrade. Stirring is continued at this temperature for forty-eight hours, care being always taken that there is an excess of anhydrous sulfuric acid in order to bind the water formed by the oxidizing process. Then the melt is poured on ice, adding bisulfite of soda. The excess of mangandioxid being dissolved, the sulfuric acid and manganese are precipitated with lime and the filtered solution transformed by carbonate of soda in the solution of the soda salt of the aldehyde disulfo-acid, which can be used directly. In order to obtain the pure product, the concentrated watery solution of the sodium salt is mixed with an equal quantity of methyl alcohol, and after the precipitated mineral salts are filtered off the remaining solution is evaporated till it becomes skinny. On addition of a small quantity of ethyl alcohol the disodium salt of the aldehyde disulfo-acid is precipitated in fine transparent crystals, which contain two molecules of water of crystallization. It is easily soluble in water, with difficulty in alcohol. With hydrochloric phenylhydrazin a very easily soluble yellowish hydrazone is formed, which is precipitated by alcohol in oily form, becoming crystalline after some hours standing. With dimethyl or diethylanilin the leucomalachit-green disulfo-acid in theoretical yield is obtained.

*Example II.*—Forty kilos of peroxid of manganese are introduced into two hundred kilos oleum of twenty-five per cent. Thereto while cooling down with ice a solution of twenty kilos of the soda salt of paratoluene sulfonic acid in forty kilos monohydrat is added, the temperature being regulated from 0° to 10° centigrade. It is indispensable to keep the melt during the whole process slightly fuming by addition of oleum. After twenty-four hours it must be continued, as per Example I. On cooling down the concentrated solution freed from sulfate and carbonate of lime by filtration, the sodium salt of the benzaldehydeparasulfo acid crystallizes out in white needles of silky appearance with hydrochloric phenylhydrazin a difficultly-soluble crystalline white hydrazone is obtained even in much diluted solution.

Substituting the solution of paratoluene sulfonic acid in sulfuric acid by the orthoisomeric acid a good yield of benzaldehydeorthosulfo acid will be obtained. The watery solution of its soda salt combined with hydrochloric phenylhydrazin gives a voluminous crystalline hydrazone. With dimethylanilin the orthosulfo acid of the leucomalachit green is formed.

In the aforesaid examples the mangandioxid may be substituted by other oxidizing material—such as peroxid of lead, chromic acid, or chromates free from water. The oleum may be added from the beginning or gradually in proportion to the formation of water.

*Example III—Process of the manufacture of metamethylbenzaldehyde disulfo-acid.*—By sulfonating the metaxylol to disulfo-acids as principal product the acid

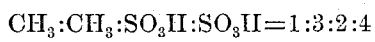
$$CH_3:CH_3:SO_3H:SO_3H = 1:3:2:4$$

is formed, which is of special interest for the production of aldehyde sulfo acids, because the aldehydes deriving therefrom correspond exclusively to the orthosulfo-acid position. For instance, to the solution of ten kilos metaxylene in thirty kilos of monohydrate thirty kilos oleum of seventy per cent. are added at a maximum temperature of 80° centigrade. After heating for one hour at 80° to 90° centigrade the melt is poured into a mixture of five hundred kilos oleum, twenty-five per cent., and fifty kilos regenerated peroxid of manganese, and the whole stirred for forty-eight hours at 35° to 40° centigrade. Afterward the product is treated as per Example I and the concentrated solution used directly for the production of dyestuffs.

The soda salt of the metamethylbenzaldehyde disulfonic acid can be separated in a similar manner as the soda salt of the 1.2.4 benzaldehyde disulfo-acid. Crystallized from methyl alcohol of eighty per cent. it forms transparent white needles or tablets, which besides the water of crystallization contain combined methyl alcohol. This compound is easily soluble in water with phenylhydrazin a yellow easily-soluble hydrazone is formed.

What I claim, and desire to secure by Letters Patent, is the following:

1. The process of manufacturing sulfo-acids of aromatic aldehydes which consists in oxidizing methylbenzene sulfonic acids in the presence of anhydrous sulfuric acid substantially as described.

2. As an article of manufacture the metamethylbenzaldehyde disulfo-acid the soda salt of which if crystallized from methyl alcohol of eighty per cent. forms transparent white needles or tablets, which besides water of crystallization contain combined methyl alcohol, the crystals being easily soluble in water, yielding if brought together with phenylhydrazin a yellow hydrazone which is easily soluble.

In testimony whereof I have signed my name to this specification in the presence of two subscribing witnesses.

ARNOLD STEINER.

Witnesses:
MELCHIOR BÖNIGER,
GEO. GIFFORD.